(12) United States Patent
Yamamoto et al.

(10) Patent No.: US 10,451,787 B2
(45) Date of Patent: Oct. 22, 2019

(54) OPTICAL FIBER AND LIGHT SOURCE DEVICE

(71) Applicant: SUMITOMO ELECTRIC INDUSTRIES, LTD., Osaka-shi, Osaka (JP)

(72) Inventors: Yoshinori Yamamoto, Yokohama (JP); Masaaki Hirano, Yokohama (JP); Yoshiaki Tamura, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 417 days.

(21) Appl. No.: 15/356,857

(22) Filed: Nov. 21, 2016

(65) Prior Publication Data
US 2017/0153375 A1 Jun. 1, 2017

(30) Foreign Application Priority Data
Nov. 27, 2015 (JP) .................. 2015-231627

(51) Int. Cl.
*G02B 6/02* (2006.01)
*F21V 8/00* (2006.01)
(Continued)

(52) U.S. Cl.
CPC ....... *G02B 6/0008* (2013.01); *G02B 6/02257* (2013.01); *G02B 6/03627* (2013.01);
(Continued)

(58) Field of Classification Search
USPC ................................. 385/123, 127
See application file for complete search history.

(56) References Cited

U.S. PATENT DOCUMENTS

2002/0057880 A1   5/2002  Hirano et al.
2004/0228593 A1*  11/2004  Sun ................... G02B 6/02014
                                                 385/127
(Continued)

FOREIGN PATENT DOCUMENTS

JP   2007-279704 A   10/2007
JP   2010-049089 A   3/2010

OTHER PUBLICATIONS

W. J. Wadsworth, et al., "Supercontinuum and four-wave mixing with Q-switched pulses in endlessly single-mode photonic crystal fibres," Optics Express, vol. 12, No. 2, pp. 299-309.

*Primary Examiner* — Eric Wong
(74) *Attorney, Agent, or Firm* — Drinker Biddle & Reath LLP (57) ABSTRACT

Provided are an optical fiber that has a short zero-dispersion wavelength, has high nonlinearity, and can cause broadband supercontinuum light to be generated with high efficiency, and a light source device that can output broadband supercontinuum light by using the optical fiber. A light source device includes a seed light source that outputs light with a central wavelength 1000 nm or more and 1650 nm or less and an optical fiber that receives the light output from the seed light source, allows the light to propagate therethrough, causes broadband light with an expanded band to be generated in accordance with a nonlinear optical phenomenon while the light propagates therethrough, and outputs the broadband light. The optical fiber is composed of silica glass, has a zero-dispersion wavelength of 1290 nm to 1350 nm, and has an effective area of 14 μm² or smaller at a wavelength of 1550 nm.

6 Claims, 10 Drawing Sheets

(51) Int. Cl.
*G02B 6/036* (2006.01)
*G02F 1/365* (2006.01)
*G02F 1/35* (2006.01)
*G02B 6/028* (2006.01)

(52) U.S. Cl.
CPC .......... *G02F 1/365* (2013.01); *G02B 6/02009* (2013.01); *G02B 6/0281* (2013.01); *G02F 2001/3528* (2013.01)

(56) References Cited

U.S. PATENT DOCUMENTS

2004/0252956 A1* 12/2004 Kalish ................ G02B 6/02009
 385/127
2009/0129409 A1* 5/2009 Hirano ............... G02B 6/02028
 372/6

* cited by examiner

| | TRANSMISSION LOSS AT 1550 nm | ZERO-DISPERSION WAVELENGTH | CHROMATIC DISPERSION AT 1550 nm | DISPERSION SLOPE AT 1550 nm | CUTOFF WAVELENGTH | Aeff at 1550 nm | MFD at 1550 nm | n2 | γ at 1550 nm |
|---|---|---|---|---|---|---|---|---|---|
| | dB/km | nm | ps/nm/km | ps/nm²/km | nm | μm² | μm | ×10⁻²⁰ m²/W | 1/W/km |
| COMPARATIVE EXAMPLE | 0.9 | 1476 | 2 | 0.022 | 1445 | 8.6 | 3.3 | 6.2 | 29.4 |
| FIBER 1 | 0.9 | 1303 | 18.6 | 0.059 | 2090 | 13.0 | 4.0 | 6.5 | 20.2 |
| FIBER 2 | 0.8 | 1344 | 11.2 | 0.04 | 1731 | 10.0 | 3.6 | 6.2 | 25.2 |
| FIBER 3 | 1.2 | 1334 | 12.5 | 0.042 | 1783 | 10.2 | 3.6 | 6.2 | 24.6 |
| FIBER 4 | 0.9 | 1325 | 13.6 | 0.045 | 1827 | 10.7 | 3.7 | 6.3 | 23.9 |
| FIBER 5 | 1.0 | 1314 | 15.6 | 0.048 | 1900 | 11.3 | 3.8 | 6.4 | 22.9 |
| FIBER 6 | 1.2 | 1330 | 12.4 | 0.039 | 2072 | 9.8 | 3.5 | 6.4 | 26.8 |
| FIBER 7 | 1.3 | 1325 | 15.9 | 0.054 | 2276 | 14.0 | 4.2 | 6.2 | 17.5 |
| FIBER 8 | 0.6 | 1329 | 12.6 | 0.042 | 1925 | 13.5 | 4.1 | 5.2 | 15.6 |
| FIBER 9 | 1.1 | 1319 | 13.7 | 0.041 | 1668 | 10.6 | 3.6 | 6.1 | 23.3 |
| FIBER 10 | 1.1 | 1296 | 18.1 | 0.051 | 1876 | 12.2 | 3.9 | 6.2 | 20.6 |
| FIBER 11 | 1.2 | 1292 | 20.1 | 0.058 | 2086 | 13.9 | 4.1 | 6.2 | 18.2 |
| FIBER 12 | 1.4 | 1332 | 12.8 | 0.043 | 1751 | 10.9 | 3.7 | 6.2 | 22.9 |
| FIBER 13 | 0.7 | 1344 | 11.7 | 0.042 | 1767 | 12.2 | 3.9 | 5.8 | 19.3 |
| FIBER 14 | 1.0 | 1346 | 11.7 | 0.042 | 1793 | 11.5 | 3.8 | 6.0 | 21.2 |
| FIBER 15 | 1.3 | 1315 | 15.1 | 0.045 | 2062 | 10.5 | 3.6 | 6.5 | 25.3 |
| FIBER 16 | 0.5 | 1347 | 10.0 | 0.035 | 1426 | 14.0 | 4.2 | 4.5 | 12.8 |
| FIBER 17 | 0.6 | 1350 | 9.3 | 0.033 | 1540 | 12.9 | 4.0 | 4.9 | 16.7 |
| FIBER 18 | 1.3 | 1299 | 20.5 | 0.061 | 2385 | 14.0 | 4.1 | 6.6 | 19.2 |

FIG. 13

| | Δ1 % | Δ2 % | Δclad % | 2a μm | b/a |
|---|---|---|---|---|---|
| COMPARATIVE EXAMPLE | 4.1 | -0.5 | -0.3 | 3.8 | 2.7 |
| FIBER 1 | 4.1 | -0.5 | -0.3 | 5.5 | 2.6 |
| FIBER 2 | 4.1 | -0.5 | +0.3 | 4.4 | 2.6 |
| FIBER 3 | 4.1 | -0.5 | -0.3 | 4.6 | 2.6 |
| FIBER 4 | 4.1 | -0.5 | -0.3 | 4.8 | 2.6 |
| FIBER 5 | 4.1 | -0.5 | -0.3 | 5.0 | 2.6 |
| FIBER 6 | 4.2 | 0 | -0.8 | 4.4 | - |
| FIBER 7 | 3.2 | 0 | 0 | 5.8 | - |
| FIBER 8 | 2.9 | 0 | -0.5 | 5 | - |
| FIBER 9 | 3.9 | -0.8 | 0 | 4.6 | 2.5 |
| FIBER 10 | 3.9 | -0.8 | 0 | 5.2 | 2.4 |
| FIBER 11 | 3.9 | -0.8 | 0 | 5.8 | 2.4 |
| FIBER 12 | 4.0 | -0.6 | 0 | 4.7 | 2.7 |
| FIBER 13 | 3.2 | -0.3 | 0 | 4.9 | 2.0 |
| FIBER 14 | 3.4 | -0.3 | 0 | 4.8 | 2.3 |
| FIBER 15 | 4.2 | -0.2 | -0.6 | 4.7 | 3.0 |
| FIBER 16 | 2.4 | -0.4 | -0.3 | 4.8 | 2.8 |
| FIBER 17 | 2.8 | -0.8 | 0 | 4.6 | 2.6 |
| FIBER 18 | 4.2 | -0.8 | -0.3 | 6.1 | 2.6 |

FIG. 14

OPTICAL FIBER AND LIGHT SOURCE DEVICE

BACKGROUND OF THE INVENTION

Field of the Invention

The present invention relates to optical fibers and light source devices.

Description of the Related Art

When high-intensity light, such as short-pulse light with the pulse width of picoseconds or femtoseconds, pulse light with the pulse width of about nanoseconds, or continuous light, propagates through a nonlinear medium, such as an optical fiber, it is known that broadband light is generated in accordance with a nonlinear optical phenomenon occurring in the nonlinear medium. The broadband light obtained in accordance with this phenomenon is called supercontinuum (SC) light. Because SC light has properties such as broadband, high power, and flat spectrum, it is expected that such SC light is to be applied to, for example, optical measurement or near-infrared spectroscopy.

W. J. Wadsworth, et al., "Supercontinuum and four-wave mixing with Q-switched pulses in endlessly single-mode photonic crystal fibres" OPTICS EXPRESS, Vol. 12, No. 2, pp. 299-309 describes a result in which SC light is generated by using a photonic crystal fiber (PCF) as an optical fiber that causes a nonlinear optical phenomenon to occur. However, a PCF has a special structure with a plurality of holes extending in the axial direction within the cross section of the fiber, and is problematic in that the manufacturing cost thereof is high.

Thus, there have been many reports describing that SC light is generated by using a highly-nonlinear optical fiber that uses silica glass as a base, the highly-nonlinear optical fiber having a core with a high refractive index and a cladding with a low refractive index (for example, see JP 2007-279704 A (referred to as "Patent Literature 1" hereinafter) and JP 2010-49089 A (referred to as "Patent Literature 2" hereinafter). These highly-nonlinear optical fibers have a simple solid structure without any holes. However, in the technology in the related art that uses highly-nonlinear optical fibers, it is difficult to expand the SC-light band to a long wavelength of 2400 nm or longer and to a short wavelength of 850 nm or shorter.

SUMMARY OF THE INVENTION

An object of the present invention to provide an optical fiber that high nonlinearity, and can cause broadband SC light to be generated with high efficiency, and a light source device that can output broadband SC light by using this optical fiber.

An optical fiber according to the present invention is composed of silica glass, has a zero-dispersion wavelength of 1290 nm to 1350 nm, and has an effective area of 14 μm² or smaller at a wavelength of 1550 nm.

A fiber cutoff wavelength of the optical fiber according to the present invention may be 1650 nm or more and 2300 nm or less. Chromatic dispersion at the wavelength of 1550 nm may be 10 ps/nm/km or more and 22 ps/nm/km or less. A nonlinear refractive index at the wavelength of 1550 nm may be $6.0 \times 10^{-20}$ m²/W or larger.

The optical fiber according to the present invention may include: a core having a refractive index $n_1$ and a diameter $2a$ and containing germanium; a depressed section that surrounds the core, has a refractive index $n_2$ and an outer diameter $2b$, and contains fluorine; and cladding surrounding the depressed section and having a refractive index $n_3$. The optical fiber may have a relationship $n_1 > n_3 \geq n_2$. A relative refractive-index difference $\Delta 1$ of the core relative to the depressed section may be 3.0% or more and 4.2% or less, a relative refractive-index difference $\Delta 2$ of the depressed section relative to the cladding may be −0.8% or more and −0.3% or less, the diameter $2a$ may be 4.0 μm or more and 6.0 μm or less, and b/a may be 2.0 or more and 3.0 or less. Furthermore, a relative refractive-index difference $\Delta$clad of the cladding relative to pure silicon dioxide may be −0.8% or more and 0% or less.

A light source device according to the present invention includes a seed light source that outputs light whose central wavelength is 1000 nm or more and 1650 nm or less, and the optical fiber according to the present invention that receives the light output from the seed light source, allows the light to propagate through the optical fiber, causes broadband light with an expanded band to be generated in accordance with a nonlinear optical phenomenon while the light propagates through the optical fiber, and outputs the broadband light.

The optical fiber according to the present invention has high nonlinearity, and can cause broadband SC light to be generated with high efficiency.

DESCRIPTION OF THE PREFERRED EMBODIMENTS

Embodiments of the present invention will be described in detail below with reference to the appended drawings. In the drawings, identical components are given the same reference signs, and redundant descriptions thereof will be omitted. The present invention is not to be limited to the following examples and is intended to include all modifications that are indicated by the scope of the claims and that have meanings equivalent to and within the scope of the claims.

In the technology in the related art that uses highly-nonlinear optical fibers, it is difficult to expand the SC-light band to a long wavelength of 2400 nm or longer and to a short wavelength of 850 nm or shorter. The reasons for this are as follows. At the long wavelength side, the intensity of seed light attenuates due to infrared absorption of silica glass at 2400 nm or longer, thus making it impossible for a nonlinear optical phenomenon to occur. On the other hand, the limit at the shortest wavelength side is determined based on a wavelength at which a group index accords with a group index at the longest wavelength of the SC occurrence band. A group index of light propagating through an optical fiber becomes minimum at a zero-dispersion wavelength and increases therefrom both toward the short wavelength side and the long wavelength side. Therefore, in order to expand the SC-light band toward the short wavelength side by shortening the wavelength at which the group index accords with a group index at the longest wavelength, it is effective to set the zero-dispersion wavelength of the optical fiber at the short wavelength side as much as possible.

The zero-dispersion wavelength of the optical fiber described in Patent Literature 1 is between 1350 nm and 1570 nm. The zero-dispersion wavelength of the optical fiber described in Patent Literature 2 is 1284 nm. The optical fiber described in Patent Literature 2 has a zero-dispersion wavelength that is shorter than the zero-dispersion wavelength of the optical fiber described in Patent Literature 1. However, in the optical fiber described in Patent Literature 2, the core is composed of pure silica glass and has a large mode field diameter of about 10 µm at a wavelength of 1550 nm, meaning that the optical fiber has low nonlinearity. Therefore, this optical fiber is not capable of efficiently generating SC light and requires a length of about several tens of meters to one kilometer. Thus, in order to expand the band at the short wavelength side of the SC light, it is desirable that the zero-dispersion wavelength of the optical fiber be shorter than the zero-dispersion wavelength of 1350 nm to 1570 nm of the optical fiber described in Patent Literature 1.

Figure 1:
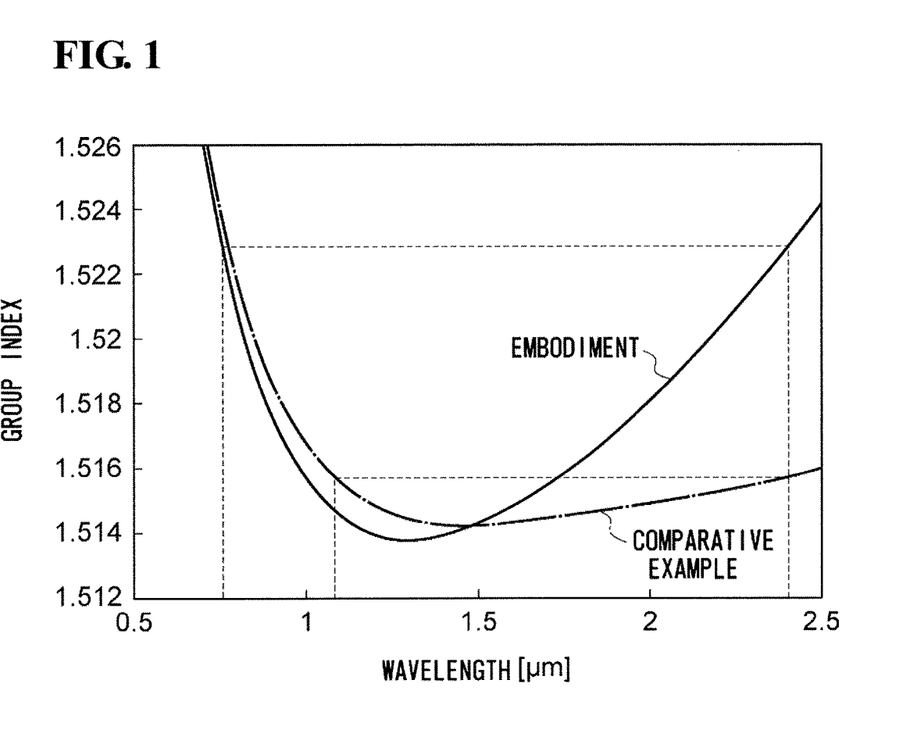
FIG. 1 is a graph illustrating the wavelength dependency of a group index of each of an optical fiber according to an embodiment of the present invention and an optical fiber according to a comparative example.

FIG. 1 is a graph illustrating the wavelength dependency of a group index of each of an optical fiber according to an embodiment of the present invention and an optical fiber according to a comparative example. The zero-dispersion wavelength of the optical fiber according to the embodiment is 1303 nm. The zero-dispersion wavelength of the optical fiber according to the comparative example is 1480 nm. In the optical fiber according to the comparative example, the wavelength at which the group index accords with the group index at a wavelength of 2400 nm is 1080 nm. In the optical fiber according to the embodiment, the wavelength at which the group index accords with the group index at the wavelength of 2400 nm is 760 nm. Therefore, the optical fiber according to the embodiment can expand the SC-light band further toward the short wavelength side.

The optical fiber according to the embodiment is composed of silica glass, has a zero-dispersion wavelength of 1290 nm to 1350 nm, and has an effective area Aeff of 14 µm$^2$ or smaller at a wavelength of 1550 nm. This optical fiber can increase the nonlinearity and can generate broadband SC light with a small fiber length with high efficiency. A nonlinearity coefficient γ[1/W/km] indicating the nonlinearity of the optical fiber is expressed as follows:

$$\gamma = 2\pi n_2 / \lambda A\text{eff},$$

where λ denotes a wavelength and $n_2$ denotes a nonlinear refractive index [m$^2$/W]. In this case, $n_2$ and γ are values measured in a linearly-polarized state in accordance with the cross phase modulation (XPM) method.

The nonlinear refractive index $n_2$ is preferably 6.0×10$^{-20}$ m$^2$/W or larger. The value γ at the wavelength of 1550 nm is preferably 20 [1/W/km] or larger, and more preferably 25 [1/W/km] or larger. The mode field diameter (MFD) at the wavelength of 1550 nm is preferably 4 µm or smaller, and more preferably 3.6 µm or smaller.

A fiber cutoff wavelength of the optical fiber according to the embodiment is preferably 1650 nm or more and 2300 nm or less. The optical fiber according to the embodiment has a fiber cutoff wavelength longer than that of the optical fiber in the related art so that propagation light can be confined in the core more intensely, whereby the effect of waveguide dispersion in chromatic dispersion can be reduced. As a result, the zero-dispersion wavelength can be set to be closer to the lower limit (1272 nm) of the zero-dispersion wavelength determined based on the material dispersion of glass.

If the fiber cutoff wavelength is long, the wavelength of the seed light may sometimes become shorter than the fiber cutoff wavelength. However, the seed light is mainly coupled with only the center of the core of the optical fiber at the input end of the optical fiber so that excitation of unwanted higher-order modes at the input end can be avoided. Furthermore, since the differences in propagation constant between the fundamental mode and the higher-order modes are large, the light can be prevented from being coupled with the unwanted higher-order mode while propagating through the optical fiber, so that the seed light can be made to propagate substantially in a single mode.

The chromatic dispersion of the optical fiber according to the embodiment at the wavelength of 1550 nm is preferably 10 ps/nm/km or more and 22 ps/nm/km or less. With the chromatic dispersion set in this range, the zero-dispersion wavelength can be set to be 1350 nm or shorter.

Figure 2A:
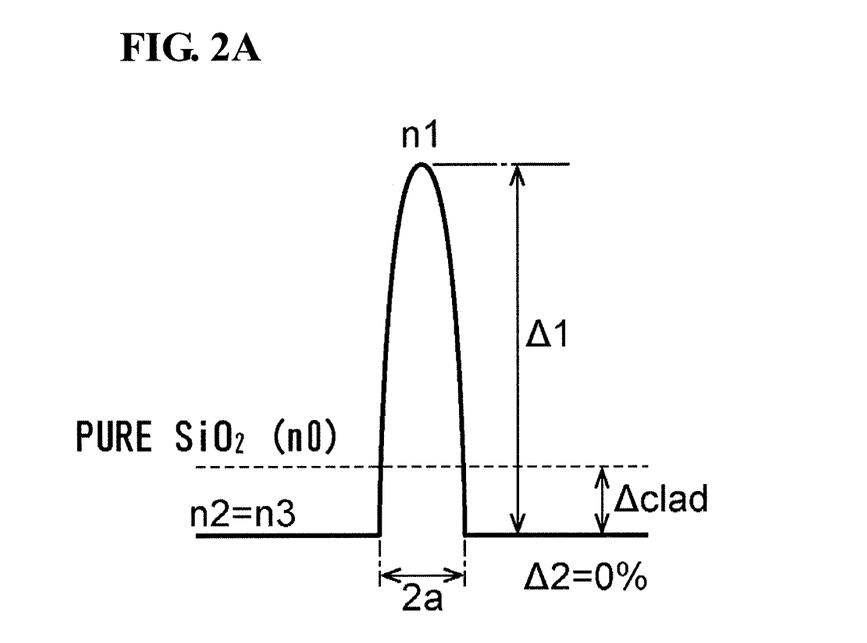
FIGS. 2A, 2B, and 2C schematically illustrate examples of refractive-index profiles of the optical fiber according to the embodiment.
Figure 2B:
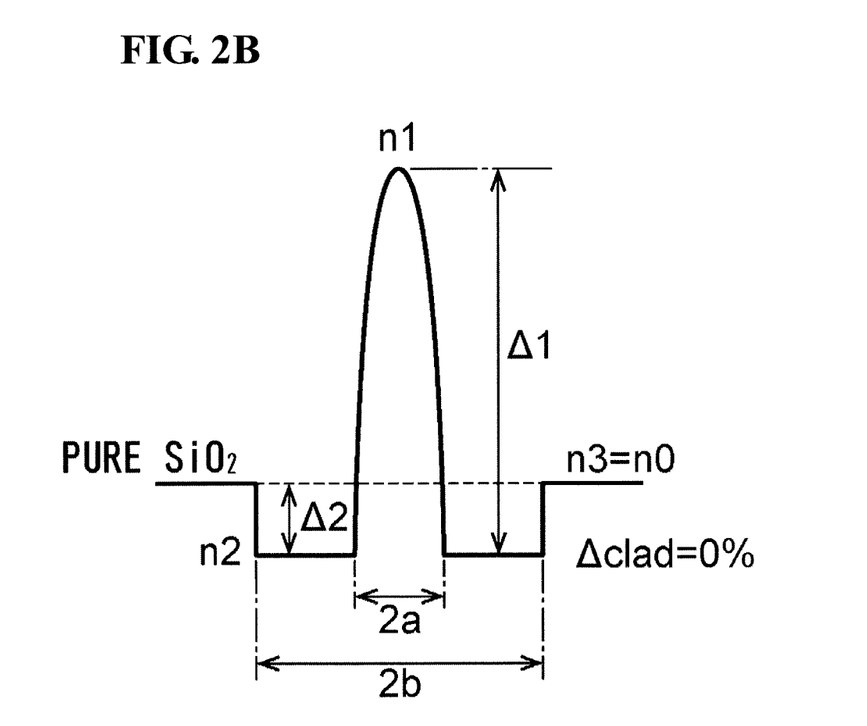
Figure 2C:
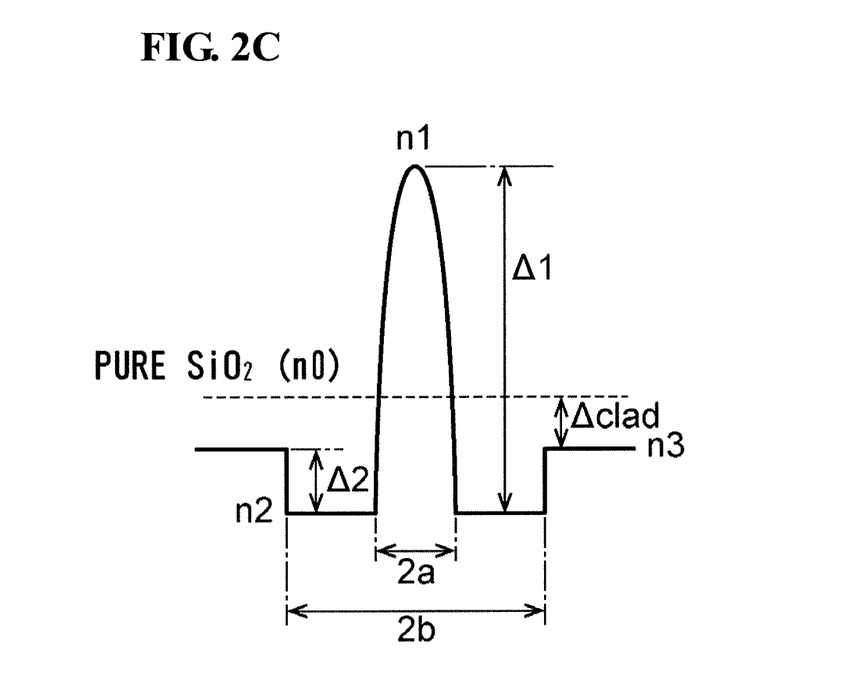

FIGS. 2A, 2B, and 2C schematically illustrate examples of refractive-index profiles of the optical fiber according to the embodiment. The optical fiber according to the embodiment has silica glass as a base and includes: a core having a refractive index $n_1$ and a diameter 2a and containing germanium (Ge); a depressed section that surrounds the core, has a refractive index $n_2$ and an outer diameter 2b, and contains fluorine (F); and cladding surrounding the depressed section and having a refractive index $n_3$. Moreover, the optical fiber according to the embodiment has the relationship $n_1 > n_3 \geq n_2$.

A relative refractive-index difference Δ1[%] of the core relative to the depressed section, a relative refractive-index difference Δ2[%] of the depressed section relative to the cladding, and a relative refractive-index difference Δclad [%] of the cladding relative to pure silicon dioxide (SiO$_2$) (i.e., a refractive index $n_0$) are expressed with the following expressions:

$$\Delta 1 = 100 \times (n_1 - n_2)/n_1,$$

$\Delta 2=100\times(n_2-n_3)/n_2,$ $\Delta\text{clad}=100\times(n_3-n_0)/n_3.$

FIG. 2A illustrates a case where $n_2=n_3$. FIG. 2B illustrates a case where $n_2<n_3=n_0$. FIG. 2C illustrates a case where $n_3<n_0$, which can be realized by adding fluorine to the cladding. With $n_3<n_0$ shown in FIG. 2C, the amount of germanium to be added to the core for achieving the same Δ1 can be reduced, as compared with FIG. 2B, so that the transmission loss can be reduced. Moreover, by adding fluorine to the cladding, the viscosity of the cladding, which occupies a major portion of the volume of the optical fiber, can be reduced so that the drawing temperature can be reduced, whereby the transmission loss can be reduced. An amount of fluorine for providing a relative refractive-index difference Δclad of −0.8% can be added.

Figure 3:
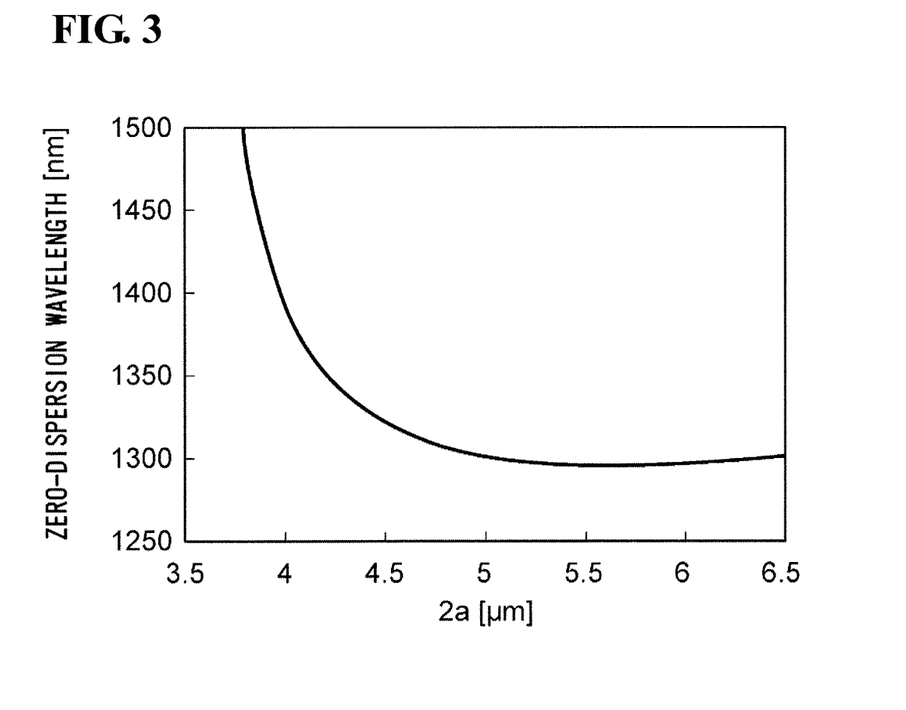
FIG. 3 is a graph illustrating the relationship between a diameter $2a$ of a core and a zero-dispersion wavelength.
Figure 4:
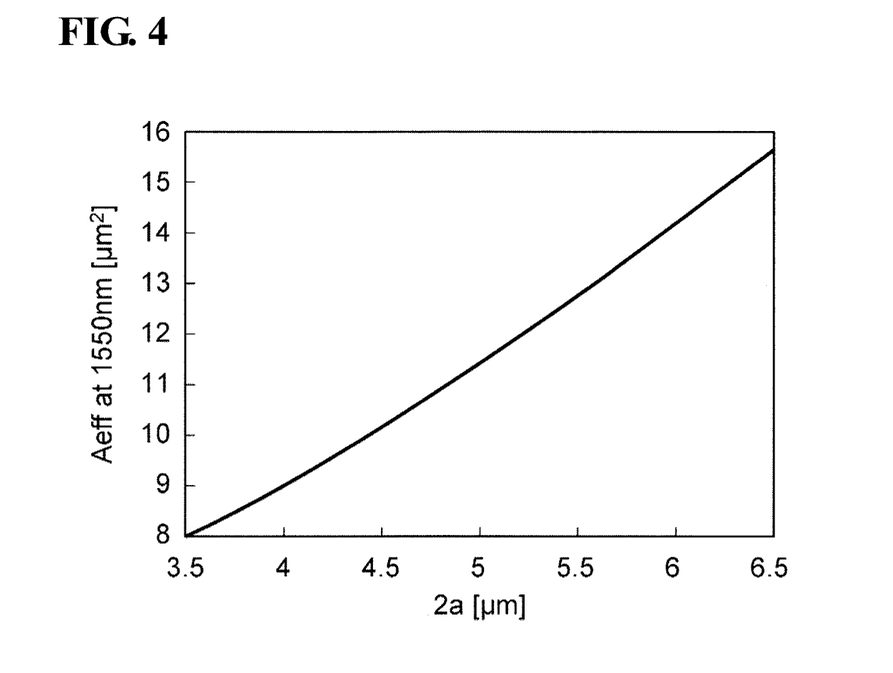
FIG. 4 is a graph illustrating the relationship between the diameter $2a$ of the core and an effective area Aeff at a wavelength of 1550 nm.
Figure 5:
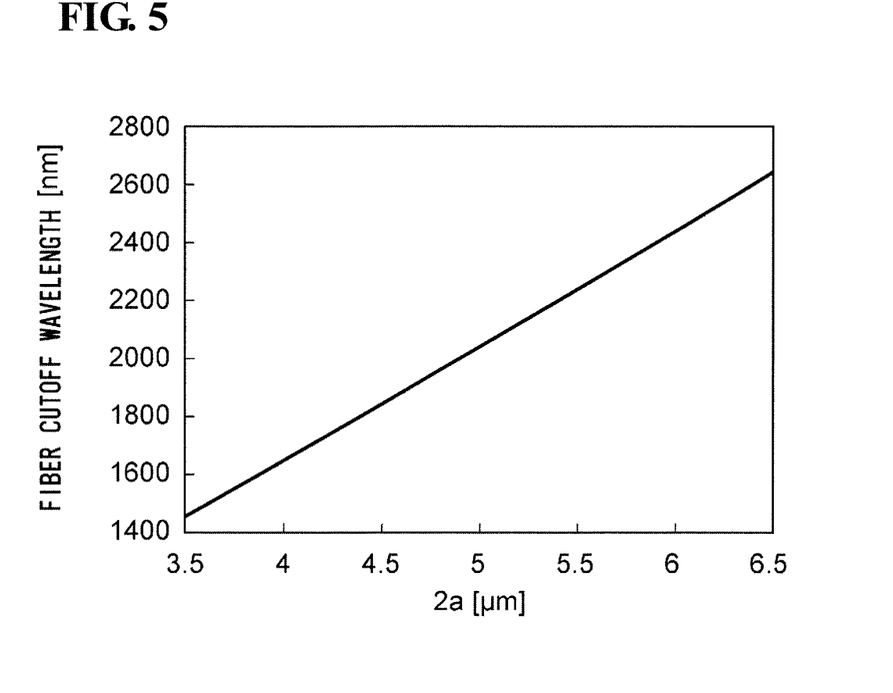
FIG. 5 is a graph illustrating the relationship between the diameter $2a$ of the core and a fiber cutoff wavelength.

FIG. 3 is a graph illustrating the relationship between the diameter 2a of the core and the zero-dispersion wavelength. FIG. 4 is a graph illustrating the relationship between the diameter 2a of the core and the effective area Aeff at the wavelength of 1550 nm. FIG. 5 is a graph illustrating the relationship between the diameter 2a of the core and the fiber cutoff wavelength. In this case, Δ1=4.1%, Δ2=−0.5%, Δclad=−0.3%, and b/a=2.6.

It is clear from FIGS. 3, 4, and 5 that the diameter 2a of the core is preferably 4.0 μm or more and 6.0 μm or less. Referring to FIGS. 3 and 5, by setting the diameter 2a of the core to 4.0 μm or larger, the zero-dispersion wavelength can be set to 1350 nm or shorter and the fiber cutoff wavelength can be set to 1650 nm or longer. On the other hand, referring to FIG. 4, when the diameter 2a of the core is 6.0 μm or smaller, the effective area Aeff is 14 μm² or larger, resulting in lower nonlinearity.

Figure 6:
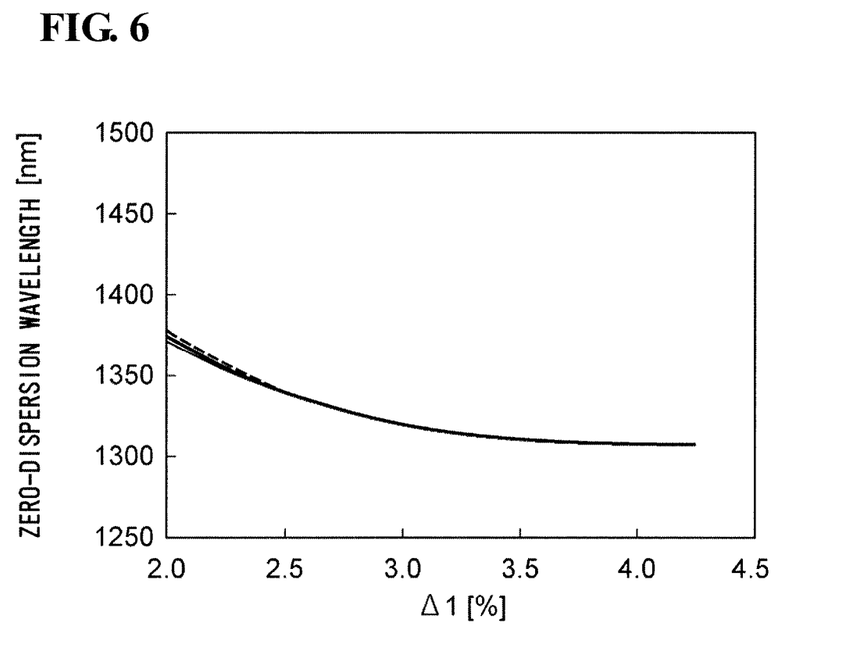
FIG. 6 is a graph illustrating the relationship between a relative refractive-index difference $\Delta 1$ of the core and the zero-dispersion wavelength.
Figure 7:
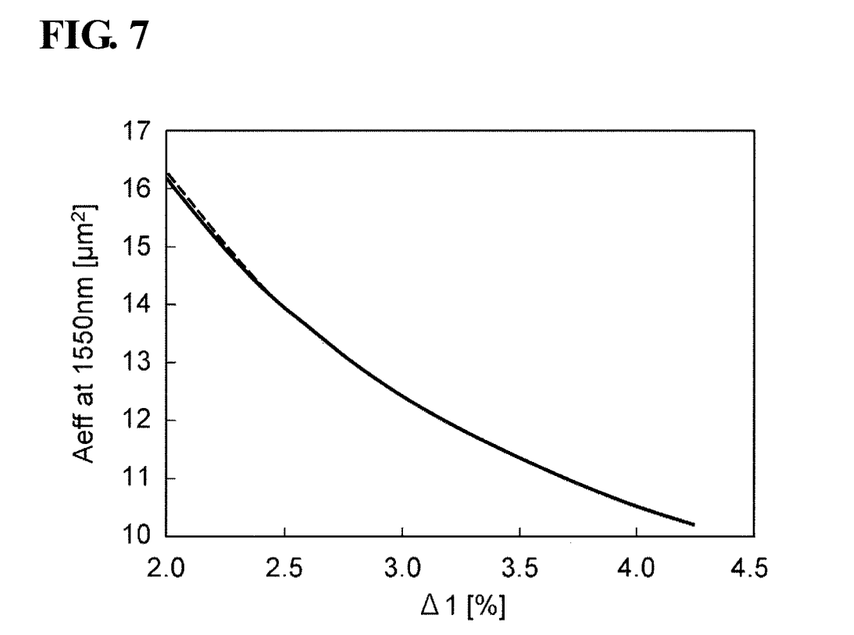
FIG. 7 is a graph illustrating the relationship between the relative refractive-index difference $\Delta 1$ of the core and the effective area Aeff at the wavelength of 1550 nm.
Figure 8:
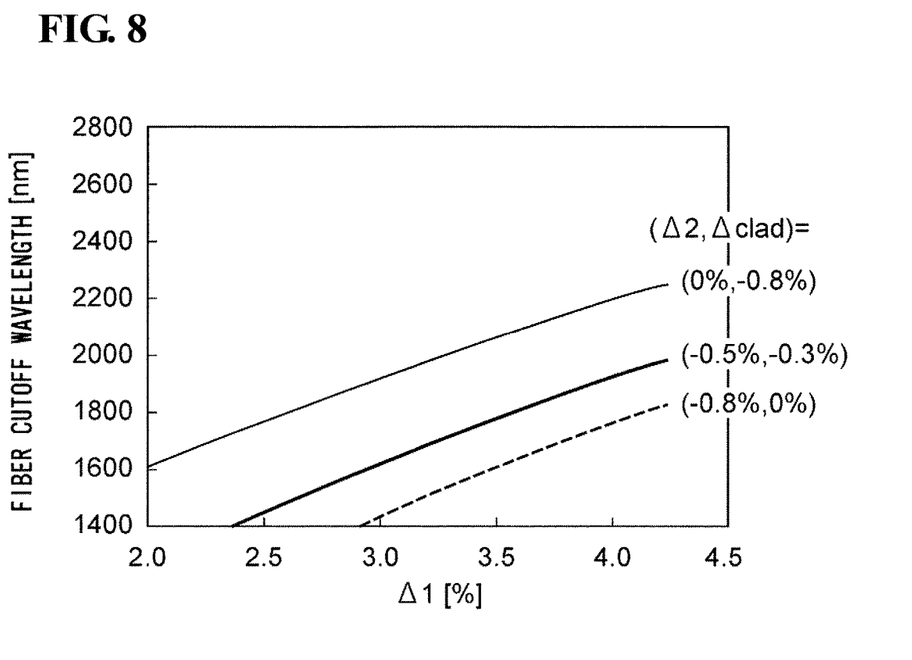
FIG. 8 is a graph illustrating the relationship between the relative refractive-index difference $\Delta 1$ of the core and the fiber cutoff wavelength.

FIG. 6 is a graph illustrating the relationship between the relative refractive-index difference Δ1 of the core and the zero-dispersion wavelength. FIG. 7 is a graph illustrating the relationship between the relative refractive-index difference Δ1 of the core and the effective area Aeff at the wavelength of 1550 nm. FIG. 8 is a graph illustrating the relationship between the relative refractive-index difference Δ1 of the core and the fiber cutoff wavelength. In this case, b/a=2.6 and 2a=4.8 μm. Moreover, three patterns are set such that (Δ2, Δclad)=(0%, −0.8%), (−0.5%, −0.3%), and (−0.8%, 0%). In the graphs shown in FIGS. 6 and 7, these three patterns substantially overlap one another.

It is clear from FIGS. 6, 7, and 8 that, by setting Δ1 to 2.4% or larger, the zero-dispersion wavelength can be set to 1350 nm or shorter and the effective area Aeff can be set to 14 μm² or smaller. Although it is possible to add an amount of germanium that increases the relative refractive-index difference relative to pure SiO₂ to about 3.4% to the core, it is realistically difficult to add germanium with even higher concentration. Furthermore, although it is possible to add an amount of fluorine that reduces the relative refractive-index difference relative to pure SiO₂ to about −0.8% to the depressed section, it is realistically difficult to add fluorine with even higher concentration. A realistic upper limit for Δ1 is about 4.2%. Therefore, Δ1 is preferably 2.4% or more and 4.2% or less, and is more preferably 3.0% or more and 4.2% or less.

Furthermore, it is clear from FIGS. 6, 7, and 8 that neither of the zero-dispersion wavelength and the effective area hardly changes even by changing Δ2 but only the fiber cutoff wavelength changes. Therefore, Δ2 that provides a desired fiber cutoff wavelength may be selected. However, since it is realistically difficult to add an amount of fluorine more than or equal to an amount at which the relative refractive-index difference relative to pure silica is equivalent to about −0.8%, Δ2 is preferably −0.8% or more and 0% or less, and is more preferably −0.8% or more and −0.3% or less in reality.

Figure 9:
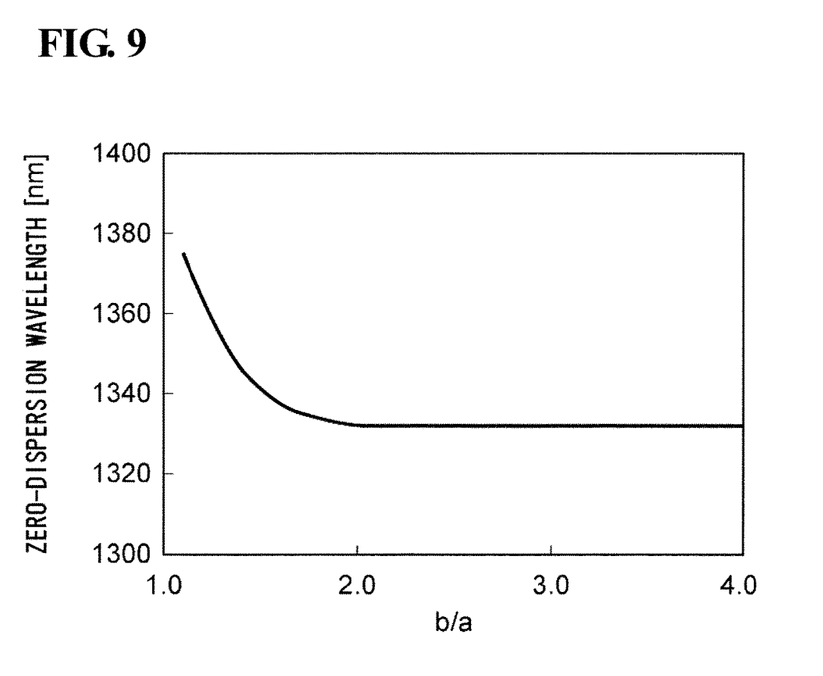
FIG. 9 is a graph illustrating the relationship between b/a and the zero-dispersion wavelength.
Figure 10:
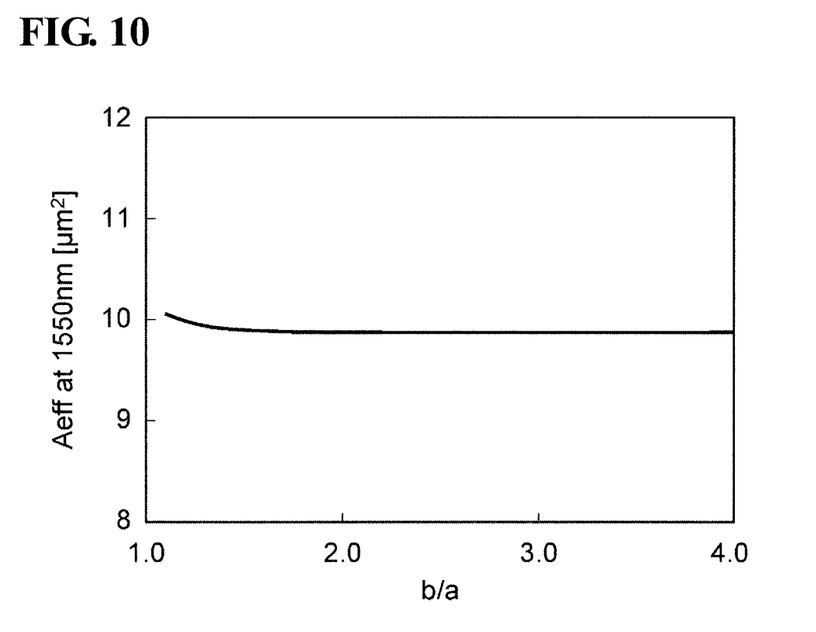
FIG. 10 is a graph illustrating the relationship between b/a and the effective area Aeff at the wavelength of 1550 nm.
Figure 11:
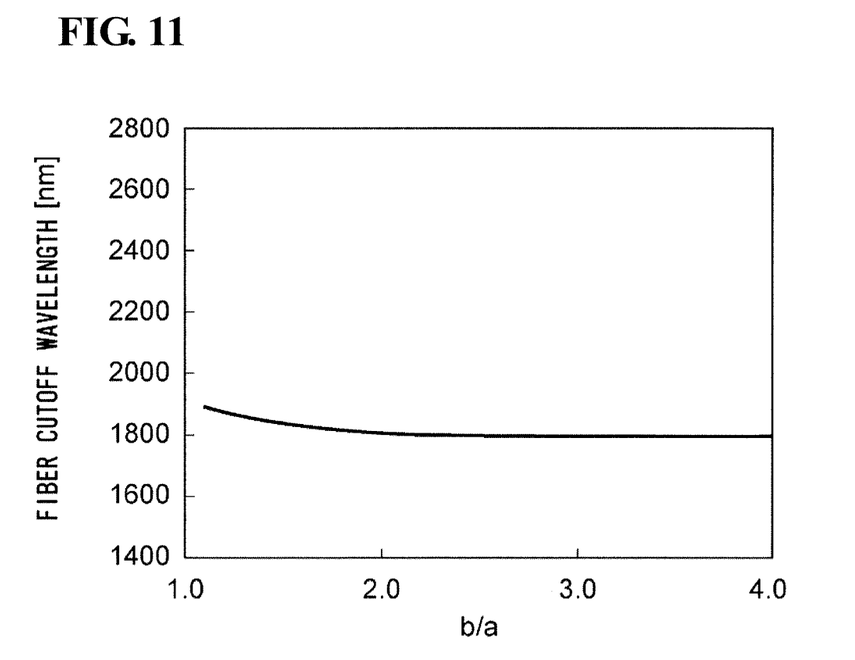
FIG. 11 is a graph illustrating the relationship between b/a and the fiber cutoff wavelength.

FIG. 9 is a graph illustrating the relationship between b/a and the zero-dispersion wavelength. FIG. 10 is a graph illustrating the relationship between b/a and the effective area Aeff at the wavelength of 1550 nm. FIG. 11 is a graph illustrating the relationship between b/a and the fiber cutoff wavelength. In this case, Δ1=4.1%, Δ2=−0.5%, Δclad=−0.3%, and 2a=4.4 μm.

It is clear from FIGS. 9 and 10 that the zero-dispersion wavelength rapidly becomes longer when b/a is 2.0 or smaller. On the other hand, there is hardly any effect on the characteristics even when b/a is increased to 3.0 or larger. Therefore, b/a is preferably 2.0 or more and 3.0 or less.

Figure 12:
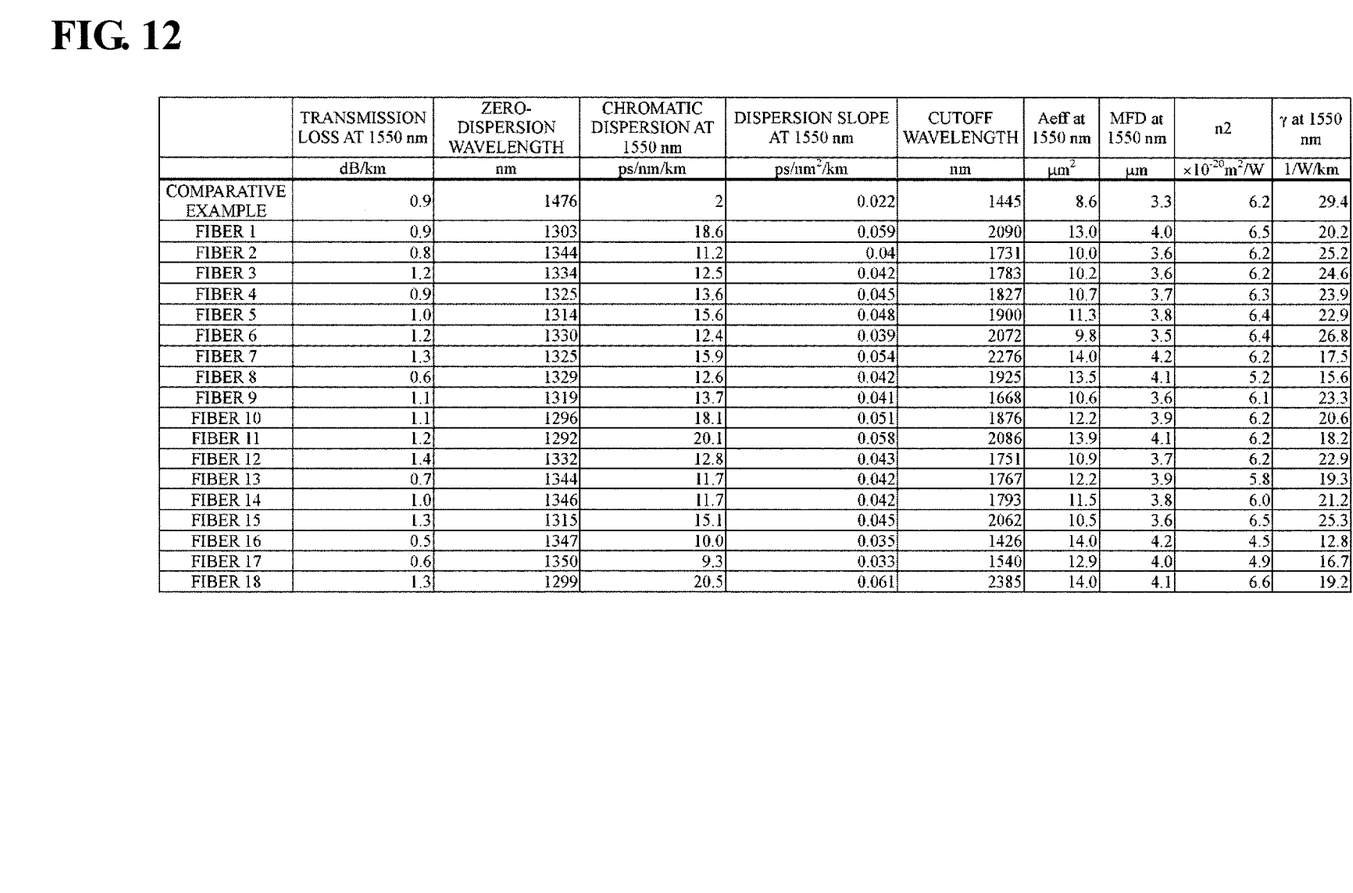
FIG. 12 illustrates a table showing the specifications of an optical fiber according to a comparative example and optical fibers according to first to eighteenth practical examples.
Figure 13:
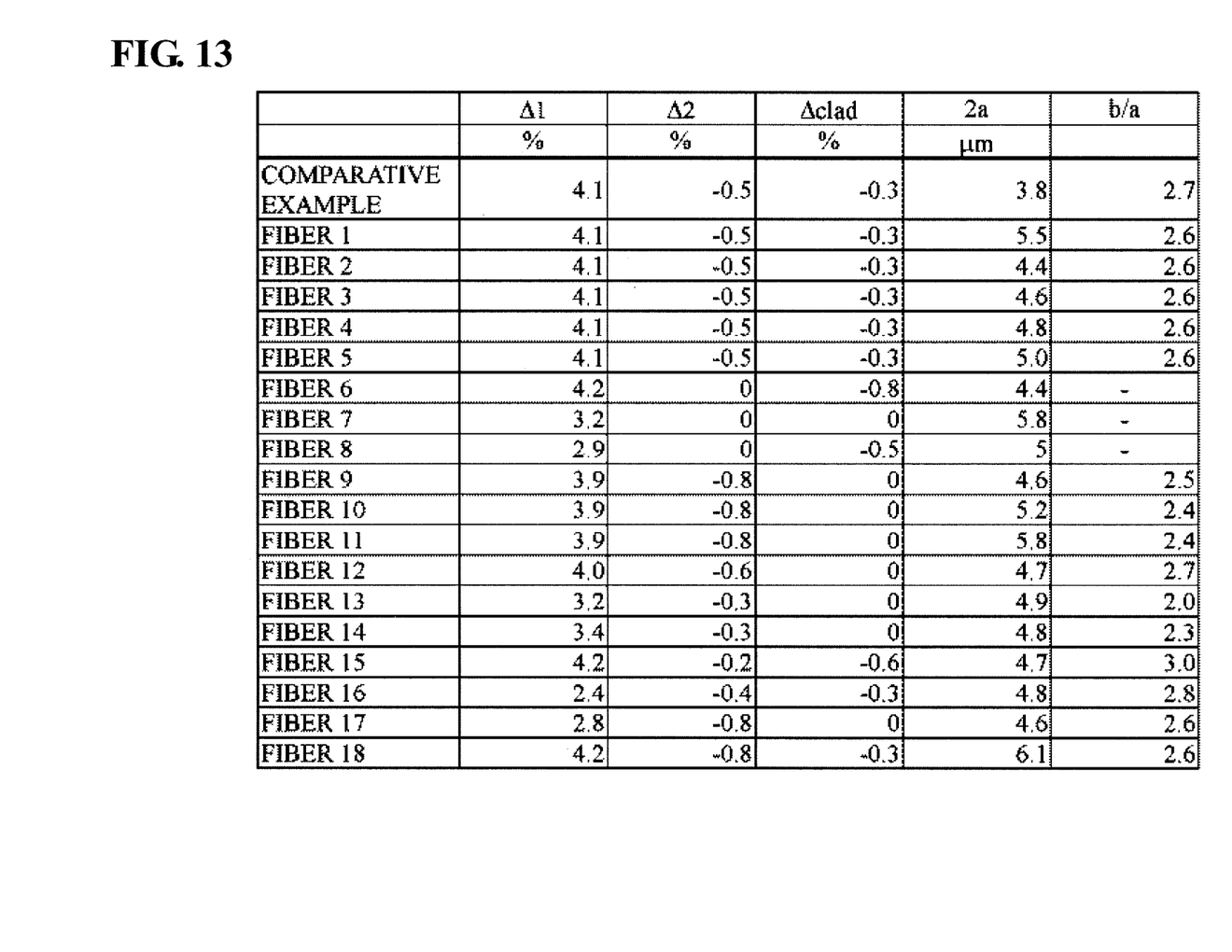
FIG. 13 illustrates another table showing the specifications of the optical fiber according to the comparative example and the optical fibers according to first to eighteenth practical examples.

FIGS. 12 and 13 illustrate tables showing the specifications of an optical fiber according to a comparative example and optical fibers 1 to 18 according to practical examples. FIG. 12 shows a transmission loss at the wavelength of 1550 nm, a zero-dispersion wavelength, chromatic dispersion at the wavelength of 1550 nm, a dispersion slope at the wavelength of 1550 nm, a fiber cutoff wavelength, an effective area at the wavelength of 1550 nm, a mode field diameter at the wavelength of 1550 nm, a nonlinear refractive index $n_2$, and a nonlinearity coefficient γ at the wavelength of 1550 nm. FIG. 13 shows Δ1, Δ2, Δclad, 2a, and b/a. An α-th power expressing the shape of refractive-index distribution of the core in the optical fiber according to each practical example is about 1.6-th power to 3.0-th power.

Figure 14:
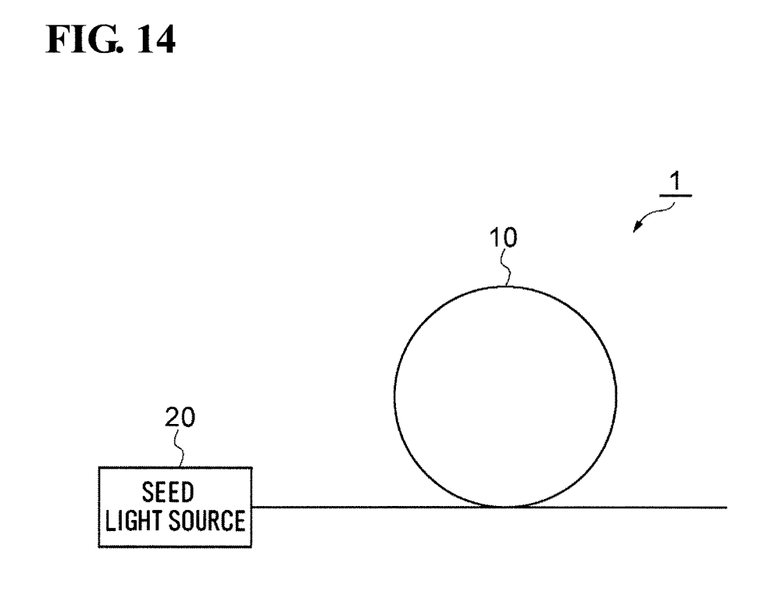
FIG. 14 schematically illustrates a light source device according to an embodiment of the present invention.

FIG. 14 schematically illustrates a light source device 1 according to an embodiment. The light source device 1 includes an optical fiber 10 according to the above-described embodiment and a seed light source 20. The seed light source 20 outputs seed light whose central wavelength is 1000 nm or more and 1650 nm or less. More preferably, the seed light source 20 outputs seed light whose central wavelength is 1200 nm or more and 1400 nm or less. The seed light to be output from the seed light source 20 is high-intensity light, such as short-pulse light with the pulse width of picoseconds or femtoseconds, pulse light with the pulse width of about nanoseconds, or continuous light. The optical fiber 10 receives the seed light output from the seed light source 20 via one end thereof, allows the seed light to propagate therethrough, causes broadband light (SC light) to be generated in accordance with a nonlinear optical phenomenon while the seed light propagates through the optical fiber 10, and outputs the SC light from the other end of the optical fiber 10. This light source device 1 can output SC light with a broader band than in the related art.

What is claimed is:

1. An optical fiber that is composed of silica glass, the optical fiber comprising:
    a core having a refractive index $n_1$ and a diameter 2a and containing germanium;
    a depressed section that surrounds the core, has a refractive index $n_2$ and an outer diameter 2b, and contains fluorine; and
    cladding surrounding the depressed section and having a refractive index $n_3$,
    the optical fiber having a relationship $n_1>n_3\geq n_2$, a relative refractive-index difference Δ1 of the core relative to the depressed section being 3.0% or more and 4.2% or less, a relative refractive-index difference Δ2 of the depressed section relative to the cladding being −0.8% or more and −0.3% or less, the diameter 2*a* being 4 μm or more and 6.0 μm or less, and b/a being 2.0 or more and 3.0 or less, wherein the optical fiber has a zero-dispersion wavelength of 1290 nm to 1350 nm, has an effective area of 14 μm² or smaller at a wavelength of 1550 nm, and has a chromatic dispersion at the wavelength of 1550 nm of 10 ps/nm/km or more and 22 ps/nm/km or less.

2. The optical fiber according to claim 1, wherein a fiber cutoff wavelength is 1650 nm or more and 2300 nm or less.

3. The optical fiber according to claim 1, wherein a nonlinear refractive index at the wavelength of 1550 nm is $6.0 \times 10^{-20}$ m²/W or larger.

4. The optical fiber according to claim 1, wherein a relative refractive-index difference Δclad of the cladding relative to pure silicon dioxide is −0.8% or more and 0% or less.

5. A light source device comprising:

a seed light source that outputs light whose central wavelength is 1000 nm or more and 1650 nm or less; and the optical fiber according to claim 1 that receives the light output from the seed light source, allows the light to propagate through the optical fiber, causes broadband light with an expanded band to be generated in accordance with a nonlinear optical phenomenon while the light propagates through the optical fiber, and outputs the broadband light.

6. The optical fiber according to claim 1, wherein a relative refractive-index difference Δclad of the cladding relative to pure silicon dioxide is −0.8% or more and −0.3% or less.

* * * * *